Patented Nov. 8, 1938

2,136,167

UNITED STATES PATENT OFFICE 2,136,167

PRODUCTION OF POLAR ADSORBENTS

Eric Berkeley Higgins, Punchetts, Twein Wood, England

No Drawing. Application June 16, 1936, Serial No. 85,618. In Great Britain April 14, 1936

6 Claims. (Cl. 252—2)

It has been recognized for a long time that products derived by the process of anerobic decomposition of vegetable matter under natural conditions which are humus-like bodies, possess to a greater or less extent the property of polar adsorption by which cations and anions of electrolytes are not taken up in equivalent amounts and this property in such products, which incidentally is shared with the naturally occurring zeolites, is an important and practically essential factor in rendering soil fertile. It has been possible to make use of the polar adsorption properties of the zeolites for commercial purposes, for example in the softening of water by the so-called base-exchange process. The humus-like bodies, however, have not been available for these purposes or for similar industrial use because the adsorption complexes in them are not insoluble in water and especially are not insoluble in alkalies, and moreover they peptize in the presence of acids. Moreover, the humus-like masses occurring naturally are slime-forming bodies without definite structure and consequently are not at all suitable for use in filter beds, which is in practice the form in which such materials are used industrially.

It is also well known that peats exhibit similar polar adsorption properties and that such properties are found to a degree in the geological relatives of peat, viz. lignites, coals and anthracites. Peats also are not free from the objections arising from solubility and physical form which apply to the natural humus-like bodies in the soil, such as leaf mould, and moreover, the more highly carbonized bodies included in the range from lignite to anthracite, although they are physically suitable for use in filter beds, have so low a polar adsorption as to render their commercial use for such purposes wholly unfeasible.

It is convenient to express the polar adsorption of different substances as a percentage by weight of calcium oxide which is adsorbed from millinormal solutions of neutral calcium chloride, that is to say the amount of calcium oxide adsorbed in grammes per 100 grammes of the adsorbent, and this method of expressing the property is adopted in the following. On this basis a lignite adsorbs from 0.02 to 0.07% of calcium oxide while an average bituminous coal containing 25% of volatiles adsorbs about ten times, and anthracite about one hundred times less.

It has been proposed to produce humus-like bodies in various ways from starches, celluloses and so forth, and in particular it has been proposed recently to prepare such bodies by the action of strong dehydrating agents such as zinc chloride, sulphur trioxide and so forth upon coals or starch, and preferably to carry out the reaction at relatively high temperatures, for example 200° C. The resulting substances possess considerable polar adsorption properties, but like the natural humus-like bodies, they are more or less without definite structure, are slime-forming and are soluble in alkalis, this last property being in fact the characteristic feature of the products.

It has now been found, however, that polar adsorbents possessing the desired qualities for any commercial or industrial use may be manufactured in a simple manner, from fossilized organic materials including the whole range of coals from and including lignites to anthracites by suitable treatment with sulphuric acid, so as in particular to produce bodies which are insoluble in alkalis. As a matter of fact, insolubility in alkalis provides a control test for the products produced according to the present invention, which does not include such bodies which are more or less soluble in alkalis.

Thus, according to the present invention the fossilized organic material, to be hereinafter referred to as coal, is treated with sulphuric acid under such conditions as to give rise to a stable product which is insoluble in alkali. It is preferable to carry out the process at ordinary temperatures, and when using a strong acid containing about 98% or more of actual sulphuric acid by weight, for example, in order to ensure that the desired product insoluble in alkali is obtained, it is desirable to take steps definitely to control the temperature and to keep it below a definite degree. The desirable properties are enhanced by treatment of the product obtained by the reaction with sulphuric acid subsequently with an alkali or an alkaline salt of a weak acid, such as sodium acetate, borax and so forth.

In carrying out the invention the coal may be first screened from dust, or washed or subjected to both treatments and dried, and it is then treated with sulphuric acid at the ordinary temperature. It is not necessary to stir or agitate the mass. It is advisable for technical reasons to reduce the starting material to a suitable size so that the particles are small enough to pass through a sieve of ⅛th mesh, but large enough not to pass through a sieve of ¹⁄₅₀th mesh before the treatment with the acid. The novel process, however, can be successfully carried out if coal is treated in large lumps, for example of the size of about one inch cubes, but the reaction then goes on at a disproportionately slow rate.

There is usually an immediate temporary slight rise in temperature of some 20 to 30° C. which is less developed the drier the raw material. This rise in temperature is probably not connected directly with the desired reaction which reaction becomes noticeable in from 15 to 30 minutes owing to a volumetric expansion of the mass of starting material. In order to obtain the best results, it is desirable to allow the reaction to proceed until this swelling is completed, which at ordinary air temperature usually occupies from some 8 to 12 hours, although this varies to a large extent with the nature of the starting material and to some extent with the mass of material being reacted upon at one time.

The reaction mass is then freed from the excess of unchanged sulphuric acid, preferably by counter-current washing with weak sulphuric acid derived from a previous batch, since in this way a great part of the excess of acid may be removed at a commercially useful concentration. Finally, the mass may be washed with water although of course it may be washed directly with fresh water with or without the addition of alkali to assist in neutralization, until the effluent wash water is substantially free from free acid as indicated by Congo paper. The primary product of reaction obtained at this stage has a polar adsorption property much greater than that of the raw material, but as already indicated, its activity is much further increased if it now be treated with an alkali, preferably both chemically weak and in a state of dilution or with a salt of a strong base and weak acid, such as borax, sodium acetate and so forth. The use of such a salt instead of the alkali, however, is not preferred. A treatment of the primary product of reaction with a neutral salt such as sodium chloride ($NaCl$), calcium chloride ($CaCl_2$) or lanthanum nitrate ($La(NO_3)_3$) can be employed in a measure instead of the washing with alkali insofar as such a treatment increases the polar adsorption of the material and the more effectively the greater the valency of the cation in respect of which lanthanum is higher than calcium, and calcium higher than sodium. However, such increase in activity is of a much lower order, particularly in respect of a given time period, than that obtained by the use of alkali or of an alkaline salt. The most satisfactory results are obtained by the use of a solution of calcium bicarbonate, sodium bicarbonate, or potassium bicarbonate of semi-normal strength or less, for then the end product is substantially neutral, that is to say it does not contain a significant amount of adsorbed hydrogen, or hydroxyl ions.

As an example, if a Kiveton Park coal which in the natural state has a polar adsorption of less than 0.01% of calcium oxide is treated with sulphuric acid, a product may be obtained having a polar adsorption of 0.74%, but after neutralization with sodium bicarbonate, the polar adsorption is 3.95% of calcium oxide.

A good product may be obtained from any lignite, coal or anthracite by simply pouring upon the dry starting material, preferably reduced to a coarse powder or gravel as already mentioned, three times by weight of cold concentrated sulphuric acid of commerce, known as 66° Bé. acid and containing from about 96–98% of sulphuric acid by weight, and allowing the reaction product to stand until the swelling is substantially completed, that is usually for about 8 to 12 hours, without any particular precautions except that if very large masses are caused to react at once, suitable distribution of the mass be arranged for to prevent an excessive temporary rise of temperature. It should be arranged that the temperature does not exceed 50° C. and is preferably less than this.

The mass is then freed from sulphuric acid by washing and it is then treated with a solution of sodium bicarbonate in such an amount that after standing in contact for two hours, the free liquid has a pH value greater than 6.5. The mass may be treated with alkali direct, omitting the previous washing. The product, preferably, after washing with water, is ready for commercial use.

It may be allowed to dry in the air or may be dried by the application of heat, although in the latter case it is desirable not to heat the mass above 120° C.

In carrying out the invention in this way, products have been prepared from such diverse starting materials as:—

A sub-bituminous lignite from Batu Arang, Selangor, F. M. S.
A lignite from Knife River, Beulah, N. Dakota, U. S. A.
A lignite from McAlister, Oklahoma, U. S. A.
A lignite from Cape Town, South Africa.
Household coal from Kiveton Park, Yorkshire, England.
A coal from Aberdare, South Wales, with 14% volatiles.
A coal from Penallta, South Wales, with 16.7% volatiles.
A coal from Cum, South Wales, with 25.0% volatiles.
A coal from Harton, Northumberland, England, with 30–32% volatiles.
Average gas coal as used by the Gas, Light & Coke Co. of London, England.
A Powell Duffryn anthracite from South Wales with 5.9% volatiles.
An anthracite from Amalgamated Anthracite, South Wales.
A Pennsylvanian anthracite, U. S. A.

The products obtained have polar adsorption properties on the basis already mentioned ranging from 7.33% of calcium oxide from the lignites to 2.2% from the anthracites. In general, the products obtained from the geologically younger coals yield the highest adsorption figure, but possess the least mechanical strength.

The simple method described above enables commercially valuable products to be obtained from all types of coals, but distillation residues, such as coke, the product known under the registered trade-mark "Coalite" or low temperature carbonization residues are inactive under the treatment. The process is, however, capable of variation within certain definite, but fairly wide, limits varying somewhat according to the different starting materials and in practical manufacture in order to obtain the optimum results both from strictly chemical considerations and from commercial expediency, the treatment already described may be varied.

As an example of such variations, the proportion of concentrated sulphuric acid may be varied upwardly from about three of acid to one of starting material within wide limits, in general with a corresponding proportionate effect as regards the properties of the end product in comparison with the properties of the starting material.

In order to illustrate this, it may be stated that a certain lignite when treated according to the invention with varying proportions of sulphuric acid of about 98% strength, yields the following results for the polar adsorption figure:

| | Percent |
|---|---|
| 1 of lignite to 50 parts of sulphuric acid | 5.58 |
| 1 of lignite to 6 parts of sulphuric acid | 3.92 |
| 1 of lignite to 3 parts of sulphuric acid | 3.52 |

As already mentioned, the highest adsorption property is accompanied with the lowest mechanical strength.

It has already been indicated that the acid employed may be more concentrated than 98% strength.

To explain the effect of the different strengths of acid it may be stated that when using a certain very soft gas coal and using three parts of acid to one part of this coal, the following results are obtained for acids from 120% to 62% concentration, the second column giving the percentage polar adsorption on the basis already described:—

| | Percent |
|---|---|
| Nordhausen 120% | 6.33 |
| 100% | 5.21 |
| 98% | 4.91 |
| 94% | 4.29 |
| 93% | 3.57 |
| 89% | 3.47 |
| 86% | 2.25 |
| 81% | 1.61 |
| 62% | 1.05 |

It will be observed from the above tabulation that with acid concentration below 98% there is a rapid falling off in the polar-adsorbent capacity.

It is clear that, within obvious limits, the effect of weaker acids is obtained if, for any starting concentration of acid, the starting product be not dried before use. There is, in general, therefore no absolute necessity to dry the starting material before the reaction; the advisability of that step may be considered from the commercial point of view in each particular case.

It has already been indicated that with different strengths of acid, the temperature at which the reaction is allowed to proceed, is a governing factor determining whether or not the products insoluble in alkali according to the invention are obtained. Thus, in all cases products useful in practice are obtained by operating at the ordinary temperature of the atmosphere which method of course possesses manifest industrial advantages. In carrying out the reaction as already indicated, high temperature must be avoided, and if necessary cooling must be provided either by suitably disposing the reaction mass to permit of air cooling and radiation losses which is the simplest method of procedure, or otherwise by the expedients of artificial cooling. It is found that control of the temperature by the gradual addition of the acid is generally unsatisfactory. In general terms, the more concentrated the acid, the lower the permissible temperature, and if acid of greater strength than 98% be used, particular care is essential, and the temperature should not be allowed to exceed 50° C., while should fuming acid be employed a temperature of 35° C. should in general not be exceeded.

If an excessive temperature be employed, the result is a product more or less soluble in alkalies and consequently not in accordance with the invention.

The new products produced according to the present invention are in granular form and of great mechanical stability. Although, generally speaking, products of sufficient mechanical stability are produced directly, this property may be increased by drying the mass at a medium temperature, for example, at 100 to 120° C. and by then allowing the dry mass to take up water by simple immersion in that liquid at the ordinary temperature or more quickly, although it is less desirable, in hot water or even in steam. The products may be fortified against peptization by precipitating upon the surface of their grains suitable pervious colloid films, as for example aluminium hydroxide, chromium hydroxide or iron hydroxide, or the silicates of those metals, or of the alkaline earth metals or of hydroxides of silicic, tungstic, molybdic, titanic, or similar acids, the deposition being most conveniently brought about by making use of the polar adsorption property of the new products themselves. For example, the grains may be coated with silicic acid by treating the product with an excess of acid, for example $\frac{1}{5}$th normal hydrochloric acid, washing out the excess of unadsorbed acid with water and then bringing the grains into a dilute solution of sodium silicate; or the new product may be similarly treated with a dilute alkali, the excess washed away and the material then brought into contact with a solution of a metal salt such as chromium or aluminium sulphate. Generally speaking, however, it will not be found necessary to have recourse to such aids to mechanical stability.

The new products are wholly insoluble in water and in cold dilute acids and alkalies, are stable to boiling water, boiling dilute alkalies, and may even be boiled for two hours with normal hydrochloric acid without loss or permanent impairment of their properties.

Their polar adsorption properties are highly developed, the precise value depending upon the raw material employed, as already explained. Actually, as already mentioned, the younger geologically the coal, the higher the adsorption figure and the lower the mechanical strength.

The stability of the new products to alkalies enables them to be employed in alkaline solutions in a manner which is out of the question with zeolites. In such a case, their polar adsorption with respect to bases may be increased from their already high value. Thus, a product prepared from the sub-bituminous lignite from Batu Arang, Federated Malay States, already referred to, had an adsorption of 2.3% of calcium oxide from neutral solution, but adsorbed 6.6% from an alkaline solution. The adsorption with respect to bases is depressed by the presence of acids.

The products also adsorb hydrogen and hydroxyl ions; thus a product obtained from a soft coal adsorbed and retained hydroxyl equivalent to 10.7% of calcium oxide or hydrogen equivalent to 3.2% of hydrochloric acid. For this reason, the new products may be used for de-alkalinating or de-acidifying solutions, either direct or following upon previous opposite treatment. Thus, as an example, the product from the soft coal just mentioned treated with hydrochloric acid until maximum adsorption is attained and washed until the effluent liquor is neutral, is capable of removing from solution 14.71% of its weight of calcium oxide before any trace of lime appears in the effluent liquid.

It is obvious that the new products are admirably suitable for the base-exchange purification of water in a manner precisely as zeolites are now used.

Again in the precipitation methods of softening hard water, it is well known that if an excess of lime is employed, a water free from carbonates and largely free from magnesium compounds may be obtained from which the precipitate settles with great ease and rapidity; the treated effluent, however, still contains free caustic lime and may contain magnesium hydrate. If such an effluent be passed through a bed of the new product obtained according to the present invention, the caustic lime and magnesia is removed bodily and an effluent results which is neutral, free from lime, from magnesia and carbonates, that is to say it is neutral and of zero hardness.

The bodies obtained according to this invention, on account of their base exchange and adsorptive properties, may be used as such for the improvement and fertilization of the soil and may, before employment for such purpose, the result of which is permanent, be treated with ammonium or potash solutions, thus serving as a means of introducing these soluble plant foods in a form proof against loss by drainage. They will naturally in course of time have their adsorbed food-stuff supply exhausted by the growing crops, but they retain their power of fixing new supplies of such food-stuffs and thus contribute permanently to the good heart of the soil so treated.

I claim:—

1. The method of producing a polar adsorbent which consists in treating a coal with at least about three times its own weight of strong sulphuric acid of at least about 96-98% concentrations and at a temperature which does not exceed 50° C.

2. The method of producing a polar adsorbent which consists in treating a coal with at least about three times its own weight of strong sulphuric acid of at least about 96-98% concentrations and at a temperature which does not exceed 50° C., and in allowing the reaction to proceed until swelling of the coal is completed.

3. The method of producing a polar adsorbent which consists in treating a coal with at least about three times its own weight of strong sulphuric acid of at least about 96-98% concentrations and at a temperature which does not exceed 50° C., allowing the reaction to proceed until swelling of the coal is completed, and washing out excess of said acid after the reaction is complete.

4. The method of producing a polar adsorbent which consists in treating a coal with at least about three times its own weight of strong sulphuric acid of at least about 96-98% concentrations and at a temperature which does not exceed 50° C., in allowing the reaction to proceed until swelling of the coal is completed, and treating the resultant product with weak alkali.

5. The method of producing a polar adsorbent which consists in reducing a coal to granular size, treating said coal with at least about three times its own weight of strong sulphuric acid of at least 96-98% concentrations and at a temperature which does not exceed 50° C., washing out excess of said acid after the reaction is complete, treating the resultant product with weak alkali, and depositing a pervious colloid film upon the surface of the grains of said product.

6. The method of producing a polar adsorbent which consists in reducing a coal to granular size, treating said coal with at least about three times its own weight of sulphuric acid of at least 96-98% concentrations and at a temperature which does not exceed 50° C., allowing the reaction to proceed until swelling of the granular product is completed, thereupon washing out excess of said acid, treating the resultant granular product with a weak alkali, and depositing a pervious colloid film upon the surface of the grains of said product.

ERIC BERKELEY HIGGINS.

CERTIFICATE OF CORRECTION.

Patent No. 2,136,167.  November 8, 1938.

ERIC BERKELEY HIGGINS.

It is hereby certified that error appears in the above numbered patent requiring correction as follows: In the grant and in the heading to the printed specification, residence of inventor, for "Punchetts, Twein Wood, England" read Punchetts, Tewin Wood, England; page 4, first column, lines 37 and 43, and second column, lines 7 and 16, claims 1, 2, 3 and 4 respectively, strike out the word "about"; and that the said Letters Patent should be read with this correction therein that the same may conform to the record of the case in the Patent Office.

Signed and sealed this 6th day of June, A. D. 1939.

Henry Van Arsdale (Seal)  Acting Commissioner of Patents.